Dec. 8, 1970  J. R. DE BAUN  3,545,102
WORLD GLOBE DEVICE

Filed May 1, 1969  3 Sheets-Sheet 1

INVENTOR.
JAMES R. DEBAUN
BY Harry R. Lubcke
AGENT

Dec. 8, 1970  J. R. DE BAUN  3,545,102
WORLD GLOBE DEVICE

Filed May 1, 1969  3 Sheets-Sheet 2

INVENTOR.
JAMES R. DEBAUN
BY  Harry R. Lubcke
AGENT

Dec. 8, 1970  J. R. DE BAUN  3,545,102
WORLD GLOBE DEVICE
Filed May 1, 1969  3 Sheets-Sheet 3
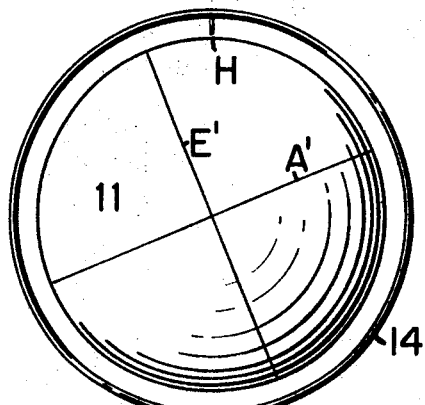
FIG. 3.
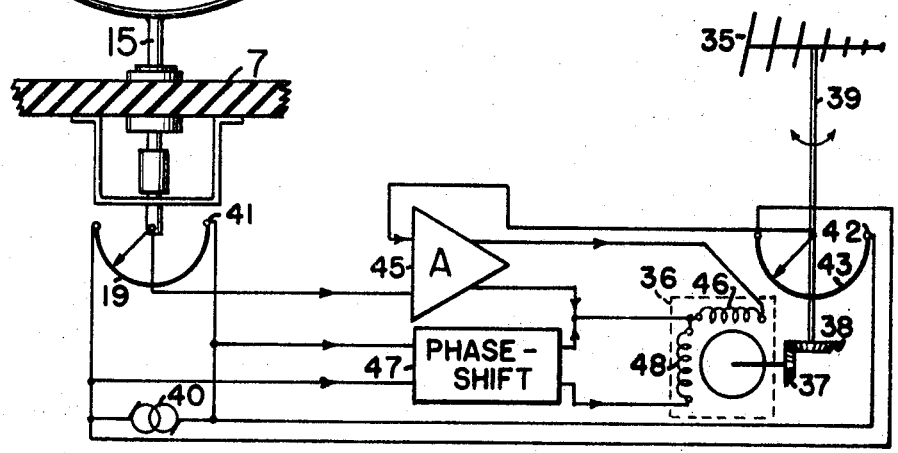
FIG. 4.
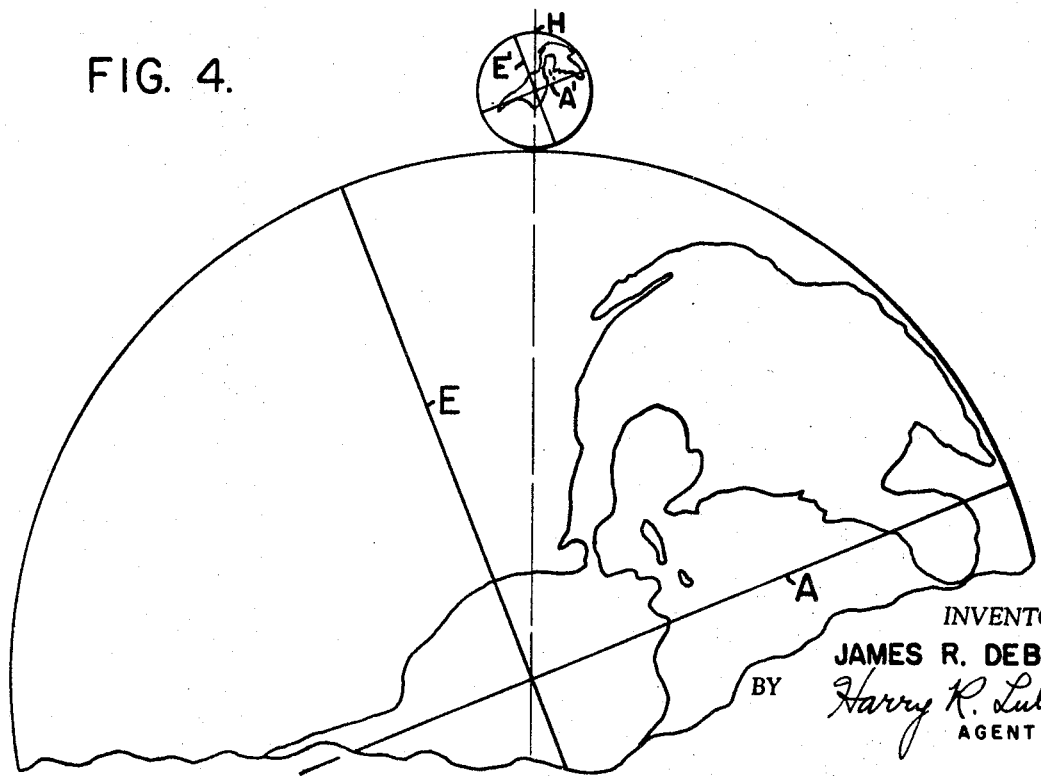
INVENTOR.
JAMES R. DEBAUN
BY Harry R. Lubcke
AGENT United States Patent Office 3,545,102
Patented Dec. 8, 1970

3,545,102
WORLD GLOBE DEVICE
James R. De Baun, Rte. 1, Box 19, Oakland, Oreg. 97462
Filed May 1, 1969, Ser. No. 820,992
Int. Cl. G09b 27/08
U.S. Cl. 35—46                                    2 Claims

ABSTRACT OF THE DISCLOSURE

A simplified device for determining true great circle path and ancillary information with respect to any selected location on the world globe. Auxiliary elements automatically orient other means, such as an antenna, to any selected great circle path. The true direction to the sun for any selected time is also obtainable, and therefrom the hemispheres of light and darkness.

BACKGROUND OF THE INVENTION

The invention pertains to world globes having circumscribed rings for determining selected paths and related directional information.

The prior art extends back to the 19th century, but it typically embodies a translucent globe with internal illuminating means to depict the location of the light and dark hemispheres, or else pertains to the determination of time throughout the world. Such devices have usually been complicated and perhaps fragile.

Others have not attempted true orientation of the globe in space, the globe being primarily for decorative or ornamental purposes. At times, conventional clocks have been incorporated in a mounting common with a world globe. A comparatively large plurality of shafts and gears have characteristically been employed.

SUMMARY OF THE INVENTION

Simplicity, and emphasis on means for providing different information than has been the objects of prior art, characterize this invention.

World-wide communication and travel creates a need for great circle path information, while the flights of satellites and inter-planetary scope dictate the use of a globe that is orientable to a true bearing in space.

Circular cursors surround the globe. Adjustments are typically manual, but by means of Selsyn motor pairs or equivalent resistive or inductive circuits the manual adjustment of a cursor may simultaneously and automatically alter the direction of an auxiliary device. One such device is a beam type radio antenna, used for transmitting and/or receiving electromagnetic waves, typically of the world-girdling short wavelength known to radio amateurs.

A double-hemispheric ring arrangement having an index gives the direction to the sun for any time of the day or night to which the globe and ring are manually adjusted. This also gives the boundary between light and darkness upon the earth.

BRIEF DESCRIPTION OF THE DRAWINGS

FIG. 3 is a diagram, partly schematic, of the globe and of an auxiliary electrical device, with means to rotate the same, and the electrical circuit interconnecting these elements.

FIG. 4 shows the globe device oriented with its axis parallel to that of the earth.

DESCRIPTION OF PREFERRED EMBODIMENTS

The typical orientation of the world globe of this invention is with a selected home location H uppermost. When so oriented and in accordance with one embodiment, gravity is employed to position the great circle cursor. When the home location is also the same as the actual location of the globe upon the earth the axis of the globe is parallel to that of the earth and the poles have correspondingly correct positions. The world globe device is thus properly oriented in space and true observations and deductions concerning the earth and space can be made.

Figure 1:
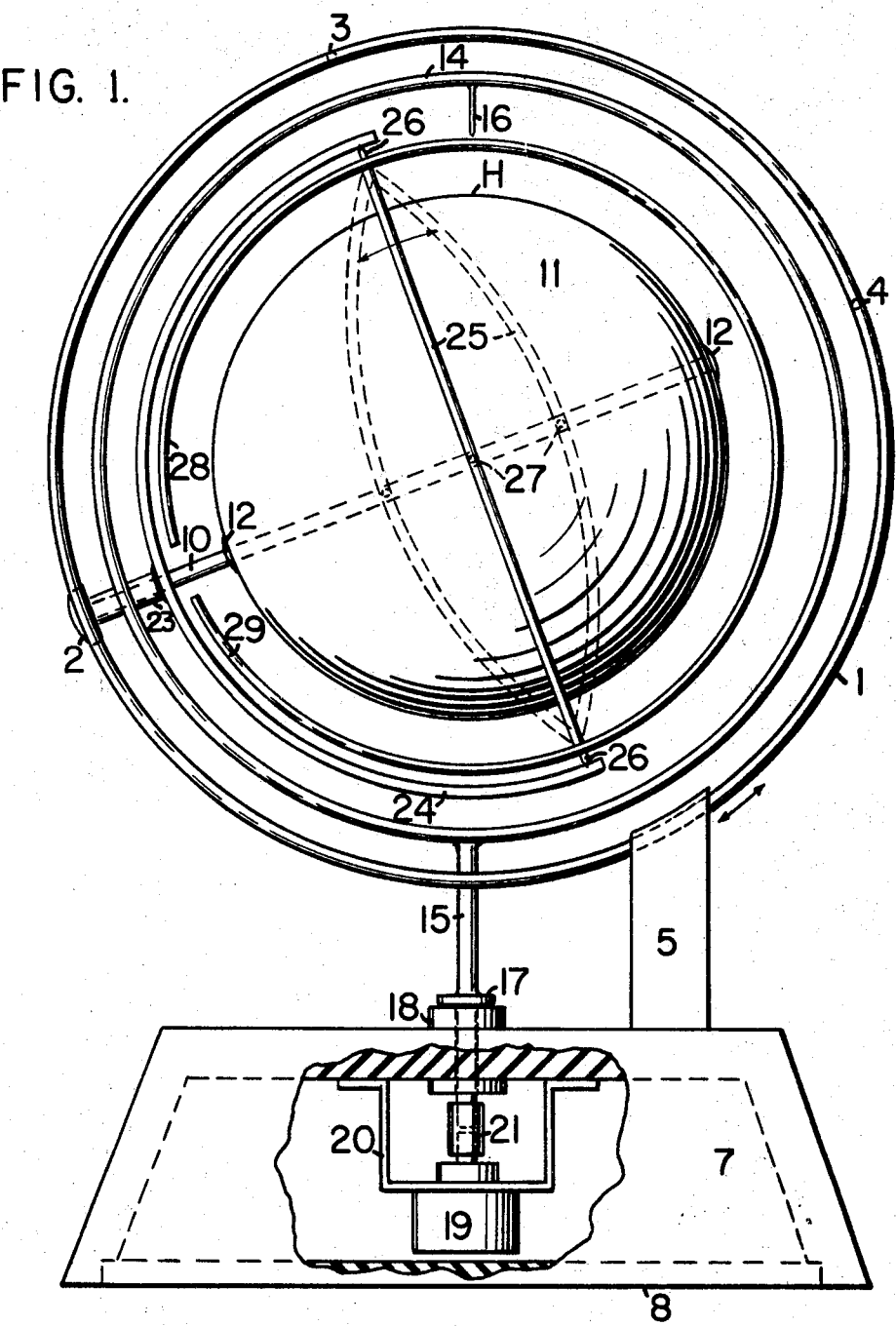
FIG. 1 is a side elevation of the globe device, with part of the base broken away to show an electrical element that is adjusted simultaneously with adjustment of the great circle cursor.

In FIG. 1 numeral 1 indicates the main latitude set gimbal. This typically takes the form of a pair of relatively closely spaced rings 1 and 1' (see FIG. 2) of stiff steel wire, which are joined together by a plurality of spacer ties 2, 3 and 4. Tie 2 is of appreciable peripheral extent and carries the bearing for the polar axis shaft, while ties 3 and 4 are simple mechanical cross-elements. Tie 4 is diametrically opposite tie 2 and tie 3 is midway between ties 2 and 4. This places the three within a semicircle, leaving the opposite semi-circle free of obstructions, to allow inclination adjustment of the polar axis according to the latitude at which the globe device is used.

A self-locking slide support 5 is asymmetrically positioned with respect to main gimbal 1 and also with respect to base 7, being molded into the latter or fastened thereto with screws. Support 5 has a general U shape, with the bottom of the U upon base 7 and the extremity of each arm bent circularly to receive a wire of gimbal 1–1', respectively. The off-center relation between the gimbal and the support results in a self-locking arrangement between the two, which is only released by manually supporting and exercising a turning moment on the gimbal, for the circumferential adjustment thereof.

Base 7 is hollow, and sufficiently deep to house certain elements having to do with great circle determinations. The base may have a circular shape, or that of any polygon including a square, as long as it has sufficient extent to provide a stable support for the globe and its circumscribed parts. A lower cover 8 is preferably arranged to fit into a recess in base 7, to prevent damage to elements within the base.

A polar axis support rod 10 is fixedly attached to latitude set gimbal 1 and etxends internal thereto along a diameter thereof. This is the support for world globe 11. Rod 10 has polar friction bearings 12 at the upper extremity thereof and also at the end near tie 2, to position globe 11 concentrically with respect to main gimbal 1. Bearings 12 typically have a round periphery and appreciable area to bear upon the globe. This provides desirable friction to retain the globe in any equatorially related lonigtude to which it is adjusted, as that of the selected home location H to the top of the globe.

The world globe 11 itself carrier a map of the world on its outer surface, as is to be noted upon the small sphere in FIG. 4. The globe is generally hollow and may be constructed of metal, plastic, fiber-board, etc., depending upon the cost of manufacture in relation to the intended use of the device.

Great circle cursor 14 is normally positioned inside of gimbal 1 at about one-third of the distance between it and the surface of globe 11. In FIG. 1, cursor 14 is supported upon filament 15, which has the form of a shaft, vertically disposed. These elements normally being constructed of metal, a brazed joint connecting the two is preferred, to provide a rugged structure. Index pin 16 is similarly attached to cursor 14 diametrically opposite, and extending inwardly. This index is used to orient the selected home location H to the top of the globe, thereby to properly orient the globe in space, as has been described. Thrust collar 17 is turned upon filament shaft 15, or made smoothly integral therewith by another manufacturing process. As assembled, collar 17 rests on bushing 18, which is integral with the top of base 7. The bushing has an internal diameter very slightly larger than the diameter of shaft 15 and a smooth and true upper surface upon which collar 17 bears.

Electrical element 19 is of significance within base 7. It is a sensor of the angular position of shaft 15 and hence of the position of great circle cursor 14. The element may be a potentiometer type variable resistor, an inductor having plural coils arranged to alter coupling with rotation of shaft 15, or a capacitor of equivalent structure. Element 19 is mechanically attached to the underside of the top of base 7 by bracket 20. Typically, mechanical coupling 21 couples shaft 15 to a colinear shaft that is a part of element 19. The electrical circuit coactive with element 19 is given in FIG. 3.

With the structure so far described the globe is capable of providing great circle path information from any selected home location (which is oriented to be at the top of the globe). This is accomplished by the mechanical elements and visual inspection of the globe device. The electrical element 19, in combination with the electrical circuit of FIG. 3 and an electrical device having directional properties, such as a beam antenna, automatically points the electrical device according to the manual adjustment of great circle cursor 14.

The true direction to the sun, a "sun tracker" function, is accomplished by further structure now to be described.

Sleeve bearing 23 surrounds polar axis support rod 10 adjacent to tie 2, with a sufficiently tight fit that it will be retained by friction at any angular position to which it is set. Integral with sleeve 23 is U shaped holder 24, of hemispherical extent. It is normally constructed of wire of the same type as cursor 14.

The extremity of a hemispherical ring 25 is attached to an extremity of the U-shaped holder on each side by means of simple bearing pivots 26. Since the U holder is rotatable about the polar axis of the globe and the hemispherical ring is rotatable about a diameter at the equator, index 27, at the center of the ring, can be positioned over any spot on the globe. However, it is normally positioned between the limits of 23½° north latitude and 23½° south latitude on the globe map.

In FIG. 1 full lines indicate the position of the hemispherical ring 25 and its index as above the equator. This is the proper latitude for the spring and autumnal equinoxes; March 21 and September 22 in each year. The dotted line to the right (north latitude) indicates the position for June 21 and the dotted line to the left (south latitude) indicates the position for December 21. Intermediate dates take intermediate latitudes. The home location H is always retained at the top of the globe and at local noon index 27 is also tt the "top" (longitude) of the globe, except for its depression from the zenith corresponding to the latitude of the home location.

Each hour the earth revolves 15°. In the use of the world globe of this invention the hemispherical ring and the U-shaped holder are manually manipulated to move 15° away from the noon position for each hour from noontime. In accordance with the latitude of the home location and the date of the year the elevation of index 27 is set between the equator and the nearest pole. In northern latitudes above 23½° the sun is always to the south of what would be a full overhead position at noon. What this amounts to is that the operator sets the proper time of day (or night) for index 27 and then reads off the information he desires. This brief manipulation makes the use of clockwork unnecessary.

An additional sunrise-sunset cursor 28–29 is rigidly attached to hemispherical ring 25 at right angles thereto. This cursor is one essentially complete circle around the globe. The half 28 thereof which leads the sun index 27 is the sunrise part of this cursor and the half 29 which lags index 27 is the sunset part of the cursor. These parts of the cursor show where the sun is rising and where it is setting with respect to the world map on the globe when the sun index 27 is oriented with true time at home location H. A break in the circumference of this cursor is provided, as shown at the left side of FIG. 1, so that it and hemispherical ring 25 as a consequence, can assume any required position over the globe; not being limited by striking polar axis rod 10.

Should this world globe device be arranged for use in the southern hemisphere, the positions of the poles are reversed on the globe map. This allows the home location H to assume a top of the globe position, as required for typical operation of the device.

Figure 2:
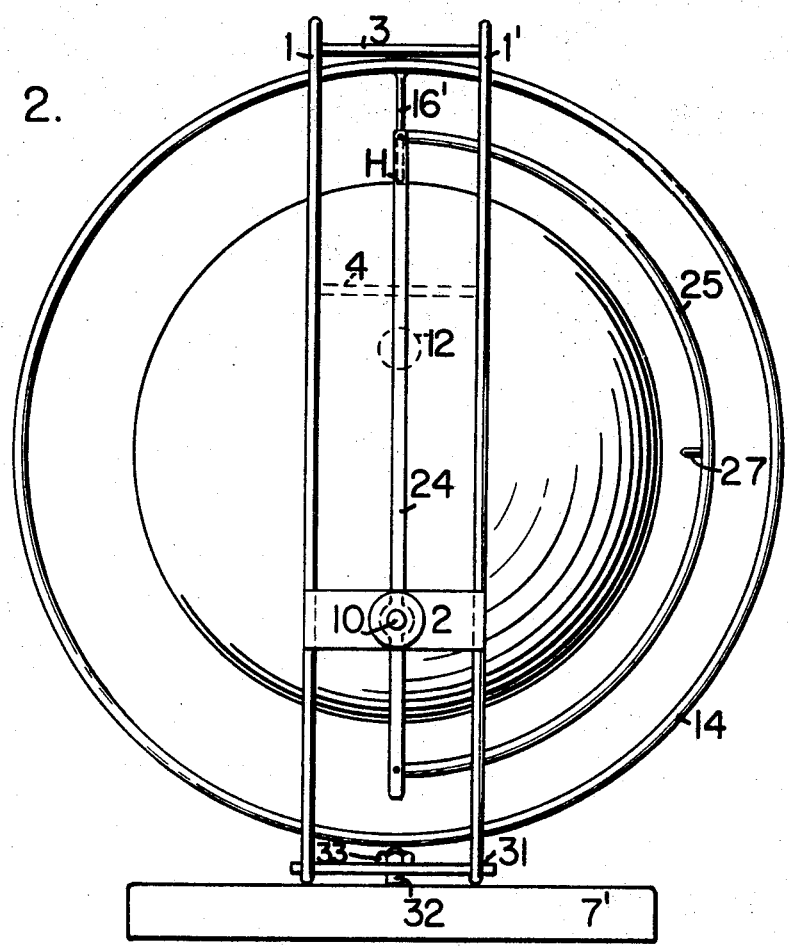
FIG. 2 is an end elevation of the same, but according to a simplified embodiment devoid of the electrical element.

This simplified embodiment of FIG. 2 shows a view of most of the elements of FIG. 1, but 90° angularly removed from the view of FIG. 1, thus giving further information on that structure.

The simplification of FIG. 2 goes principally to eliminating the electrical equipment; element 19 and associated components. This removes shaft 15 and self-locking slide support 5, and makes possible suspension of great circle curor 14 over home location H. Gravity control then maintains the great circle relation wherein the plane of the cursor passes through the center of the globe.

In FIG. 2, main latitude set gimbal 1 is seen to consist of two circular rings 1 and 1', lying in parallel planes. These are spaced apart enough to provide mechanical stability for the globe structure; a distance, say, of from one-sixth to one-fourth of thed iameter of the globe itself. Great circle cursor 14 is shown in FIG. 2 in a position 90° removed from its position in FIG. 1 (it is shown as a circle in both figures). In FIG. 2 it is suspended by index pin 16', rather than by being supported by shaft 15, as in FIG. 1. Pin 16' has a sharp point, such as will remain at any given top position of globe 11, with gravity providing the proper orientation in the vertical plane. The operator orients cursor 14 by hand until it embraces the great circle path in which he may be interested.

The simplified embodiment of FIG. 2 has a simple, flat base 7', upon which latitude set gimbal rings 1 and 1' are adjustably clamped by cross-piece 31, stud 32 and nut 33. In this view that is 90° removed from the view of FIG. 1, the nature of hemispherical ring 25 and sun index 27 is seen with greater clarity than in FIG. 1. The globe and other surrounding rings are the same as in FIG. 1.

In FIG. 3, globe 11 and other elements including potentiometer element 19 are as previously shown and described in FIG. 1. The remainder of the figure discloses means for orienting directional electromagnetic-wave antenna 35 in the same direction in space as is selected by the operator for the position of great circle cursor 14 in relation to globe 11. This is accomplished by means of two-phase motor 36, in conjunction with bevel gears 37, 38 and rotatable mast 39.

The motor is suitably controlled by the circuit, in which one terminal of power source 40 is connected to one terminal 41 of potentiometer 19 and also to a corresponding terminal 42 of second potentiometer 43. The other terminal of the power source and the other terminals of the potentiometers are similarly connected together. The wiper arms of each potentiometer are connected to the input of amplifier 45. While various frequencies may be selected for alternating current power source 40, a frequency of 400 hertz is suitable to give desired resolution in angularly positioning antenna 35. The output of amplifier, typically of 100 watts, is connected across stator winding 46 of two-phase motor 36. A second output is taken from power source 40 and is phase shifted 90° by phase-shifter 47, thereafter to power the second stator winding 48 of motor 36.

Mast 39 is caused to take the same angular position as great circle cursor 14 in the following manner. Potentiometers 19 and 43 constitute an electrical bridge. The wiper arms thereof are connected to the input of the amplifier, providing an input voltage when the bridge is unbalanced. This input voltage shifts 180° depending upon the relative positions of the wipers and goes to zero when the bridge is balanced. The excitation to field 48 is fixed and constant, while that of field 46 either leads or lags the excitation to field 48 by 90° and disappears when the bridge is balanced. Accordingly, motor 36 will run in the direction required to restore balance to the bridge and will stop when balance is obtained.

FIG. 4 illustrates the relation between the properly oriented world globe device and the earth itself. For clarity the size of the globe device has been greatly increased. It is seen that the axes of the two globes are parallel. The home locations H are also at the "top" of each; for example, a home location of Honolulu. This city is at 157° west longitude and 22° north latitude. FIG. 4 illustrates the view as seen from outer space above 67° west longitude and 0° latitude. Parallel axes A and A' and parallel plane equators E and E' are to be noted.

The term "hemispheric ring" has been used herein to relate to a hemisphere of the globe. The ring itself, of course, is semicircular.

What is claimed is:
1. A world globe device comprising;
 (a) only one globe (11) having the features of the world upon it,
 (b) a base (7) having a U shaped support (5), with each extremity thereof formed into an enclosing configuration,
 (c) a pair of circular gimbal rings (1,1'), each passing through one said enclosing configuration for circumferentially adjustable mounting within said support (5),
 (d) at least one spacer (3) transversely attached to each of said gimbal rings to hold said gimbal rings in a spaced relationship,
 (e) a shaft (10), attached to, and diametrically disposed within, said gimbal rings, pasing axially through said globe with respect to said features of the world, to support said globe for rotation about said shaft,
 (f) a circular ring cursor (14), having an index (16) at the top thereof, said cursor closely concentrically surrounding said globe inside of said gimbal rings to relate to said features of the world,
 (g) a vertical shaft (15) revolvably disposed in said base (7) between said pair of gimbal rings, to vertically support said cursor (14) in a vertical plane passing through the center of said globe (11),
 (h) a U shaped holder (24), having semicircular extent,
 (i) means to fasten (23) the center of said holder at the lower prolongation of the axis (10) of said world globe,
 (j) a single adjustable radially and laterally narrow semicircular ring (25), frictionally attached to each extremity of said U shaped holder, and
 (k) an index (27) at the center of the semicircular extent of said ring,
  whereby, upon said holder (24) being manually given a position corresponding to true time upon said globe with said axis (10) parallel to the axis of the earth, said index points in the true direction to the sun from a home location H disposed at the top of said globe at that time.

2. The world globe of claim 1, which additionally includes,
 (a) a radially and laterally narrow ring (28, 29) rigidly attached at right angles to each extremity of said semicircular ring (25), to delineate the arcs of sunrise and sunset upon said globe.

References Cited

UNITED STATES PATENTS

| | | | |
|---|---|---|---|
| 71,830 | 12/1867 | Williamson | 35—47 |
| 168,514 | 10/1875 | McVicar | 35—46 |
| 205,111 | 6/1878 | MacVicar | 35—45 |
| 209,993 | 11/1878 | Turnbull et al. | 35—46 |
| 2,403,920 | 7/1946 | Hagner | 35—46 |
| 2,429,754 | 10/1947 | Hagner | 35—46X |
| 2,687,582 | 8/1954 | Storz | 35—43 |
| 2,958,959 | 11/1960 | Hubbard | 35—46 |
| 3,133,359 | 5/1964 | Kuriyama | 35—46 |

JEROME SCHNALL, Primary Examiner